United States Patent
Kumar et al.

(10) Patent No.: US 9,940,143 B2
(45) Date of Patent: Apr. 10, 2018

(54) USING PERIPHERAL COMPONENT INTERCONNECT EXPRESS VENDOR-DEFINED MESSAGE (PCIE-VDM) AND INTER-INTEGRATED CIRCUIT ($I^2C$) TRANSPORT FOR NETWORK COMMUNICATIONS

(71) Applicant: Dell Products, L.P., Round Rock, TX (US)

(72) Inventors: Ajeesh Kumar, Bangalore (IN); Yarriswamy Chandranna, Bangalore (IN); Kala Sampathkumar, Bangalore (IN); Elie Antoun Jreij, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 170 days.

(21) Appl. No.: 15/073,012

(22) Filed: Mar. 17, 2016

(65) Prior Publication Data
US 2017/0269943 A1    Sep. 21, 2017

(51) Int. Cl.
*G06F 9/44*     (2006.01)
*G06F 1/32*     (2006.01)
*G06F 13/42*    (2006.01)

(52) U.S. Cl.
CPC ......... *G06F 9/4416* (2013.01); *G06F 1/3287* (2013.01); *G06F 9/442* (2013.01); *G06F 13/4282* (2013.01)

(58) Field of Classification Search
CPC .. G06F 13/4282; G06F 1/3287; G06F 9/4416; G06F 9/442
See application file for complete search history.

(56) References Cited

U.S. PATENT DOCUMENTS

| | | | |
|---|---|---|---|
| 8,112,618 B2 * | 2/2012 | Brokish | G06F 21/575 713/1 |
| 8,171,321 B2 * | 5/2012 | Kumar | G06F 1/3209 710/305 |
| 2015/0331473 A1 * | 11/2015 | Jreji | G06F 1/3206 713/320 |
| 2016/0323148 A1 * | 11/2016 | Butcher | H04L 41/04 |

* cited by examiner

*Primary Examiner* — Fahmida Rahman
(74) *Attorney, Agent, or Firm* — Fogarty LLP

(57) ABSTRACT

Systems and methods for using Peripheral Component Interconnect Express Vendor-Defined Message (PCIe-VDM) and Inter-Integrated Circuit ($I^2C$) transport for network communications are described. In some embodiments, an IHS may include: a host processor; a Basic Input/Output System (BIOS) coupled to the host processor; a Baseboard Management Controller (BMC) coupled to the host processor; and a memory coupled to the BMC, the memory having program instructions stored thereon that, upon execution, cause the BMC to: receive a message over a network while the host processor is powered off, wherein the message originates from a remote IHS and targets the BMC; and in response to a pass-through data transfer rate available to the BMC not meeting a threshold value: power on the host processor; request that the BIOS boot up; and perform a communication with the remote IHS via a PCIe bus using a PCIe-VDM supported by the host processor.

17 Claims, 4 Drawing Sheets

USING PERIPHERAL COMPONENT INTERCONNECT EXPRESS VENDOR-DEFINED MESSAGE (PCIE-VDM) AND INTER-INTEGRATED CIRCUIT ($I^2C$) TRANSPORT FOR NETWORK COMMUNICATIONS

FIELD

This disclosure relates generally to Information Handling Systems (IHSs), and more specifically, to systems and methods for a Baseboard Management Controller (BMC) to use Peripheral Component Interconnect Express Vendor-Defined Message (PCIe-VDM) and Inter-Integrated Circuit ($I^2C$) transport for network communications.

BACKGROUND

As the value and use of information continues to increase, individuals and businesses seek additional ways to process and store information. An option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In various implementations, an IHS may include a Baseboard Management Controller (BMC) or service processor. An example of BMC includes the integrated DELL Remote Access Controller (iDRAC) from DELL, INC., which is embedded within DELL POWEREDGE servers and provides functionality that helps administrators deploy, update, monitor, and maintain IHSs without the need for additional software to be installed. Service processors such as the iDRAC can use a dedicated Network Interface Card (NIC) for remote management, or may share one of its host's integrated NICs. An advantage of using a shared NIC is that it reduces network cabling and required ports on the switch.

SUMMARY

Embodiments of systems and methods for using Peripheral Component Interconnect Express Vendor-Defined Message (PCIe-VDM) and Inter-Integrated Circuit ($I^2C$) transport for network communications are described herein. In an illustrative, non-limiting embodiment, an IHS may include: a host processor; a Basic Input/Output System (BIOS) coupled to the host processor; a Baseboard Management Controller (BMC) coupled to the host processor; and a memory coupled to the BMC, the memory having program instructions stored thereon that, upon execution, cause the BMC to: receive a message over a network while the host processor is powered off, wherein the message originates from a remote IHS and targets the BMC; and in response to a pass-through data transfer rate available to the BMC not meeting a threshold value: power on the host processor; request that the BIOS boot up; and perform a communication with the remote IHS via a PCIe bus using a PCIe-VDM supported by the host processor.

The program instructions may further cause the BMC to evaluate the pass-through data transfer rate available to the BMC through an Inter-Integrated Circuit ($I^2C$) bus. The BIOS may be configured to evaluate whether the booting up is being requested in order for the BMC to perform the communication. The BIOS may also be configured to boot up in a special mode of operation that skips a memory test. Additionally or alternatively, the BIOS may be configured configured to boot up in a special mode of operation that skips a video initialization procedure. Additionally or alternatively, the BIOS may be configured to boot up in a special mode of operation that only enumerates one or more PCIe slots.

The BIOS may be configured to halt the booting of the host processor upon enumeration of the one or more PCIe slots at least until the communication with the remote IHS is performed. The BIOS may also be configured to place the host processor in a low-power state while the communication with the remote IHS is performed. The program instructions, upon execution, may further cause the BMC to: determine that the communication with the remote IHS is complete and power off the host processor.

In another illustrative, non-limiting embodiment, a method may include receiving, at a BMC of an IHS while a host processor of the IHS is powered off, a network packet that originates from a remote IHS and targets the BMC; and determining that a pass-through data transfer rate available to the BMC through an $I^2C$ bus is insufficient for performing a communication between the BMC and the remote IHS; requesting that a BIOS boot up the host processor in a PCIe pass-through mode of operation; establishing the communication between the BMC and the remote IHS via a PCIe bus using a PCIe-VDM supported by the host processor; and powering off the host processor after the communication is completed.

The BIOS may be configured to skip a memory test procedure upon a determination that the request is being made to enable PCIe pass-through communications. Additionally or alternatively, the BIOS may be configured to skip a video initialization procedure upon the determination that the request is being made to enable PCIe pass-through communications. Additionally or alternatively, the BIOS may be configured to enumerate one or more PCIe slots upon the determination that the request is being made to enable PCIe pass-through communications. Additionally or alternatively, the BIOS may be configured to halt the booting of the host processor upon enumeration of the one or more PCIe slots at least until the communication between the BMC and the remote IHS is completed. Additionally or alternatively, the BIOS may be configured to place the host processor in a low-power state while the communication between the BMC and the remote IHS is performed.

In yet another illustrative, non-limiting embodiment, a memory device may have program instructions stored thereon that, upon execution by an IHS, cause the IHS to: receive, at a BMC while a host processor is powered off, a packet that originates from a remote IHS and targets the BMC; and determine that a pass-through data transfer rate available to the BMC through a $I^2C$ bus is insufficient for performing a communication between the BMC and the remote IHS; request that a BIOS boot up the host processor in a PCIe pass-through mode of operation; establish the communication between the BMC and the remote IHS via a PCIe bus using a PCIe-VDM supported by the host processor; and power off the host processor after the communication is completed.

The BIOS may be configured to skip a memory test procedure and a video initialization procedure upon a determination that the request is being made to enable PCIe pass-through communications. Additionally or alternatively, the BIOS may be configured to enumerate one or more PCIe slots upon the determination that the request is being made to enable PCIe pass-through communications. Additionally or alternatively, the BIOS may be configured to halt the booting of the host processor upon enumeration of the one or more PCIe slots at least until the communication between the BMC and the remote IHS is completed. Additionally or alternatively, the BIOS may be configured to place the host processor in a low-power state while the communication between the BMC and the remote IHS is performed

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
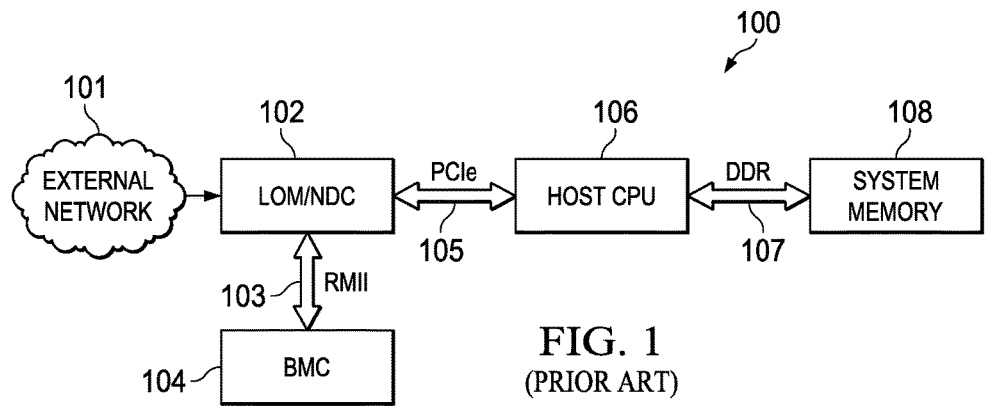
FIG. 1 is a diagram of a conventional system for handling pass-through packets in an Information Handling System (IHS).

FIG. 1 is a diagram of a conventional system for handling pass-through packets in an Information Handling System (IHS). For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components (as shown in more detail in FIG. 5 below).

FIG. 1 is a diagram of conventional system 100 for handling pass-through packets in an IHS. As shown, external network 101 is coupled to shared Local Area Network (LAN)-on-Motherboard (LOM) or Network Daughter Card (NDC) 102. Shared LOM/NDC 102 is coupled to host processor or CPU 106 via Peripheral Component Interconnect Express (PCIe) bus 105 and to Baseboard Management Controller (BMC) or service processor 104 via Reduced Media-Independent Interface (RMII) bus 103.

In operation, shared LOM/NDC 102 manages incoming and outgoing packets for both host processor 106 and BMC 104. Network packets originated from or intended for BMC 104 (e.g., as determined by a packet's origin or destination address, respectively), also referred to herein as "pass-through" or "PT" packets, are forwarded to BMC 104 via RMII bus 103, while network traffic intended for host processor 106 is sent to host processor 106 via PCIe bus 105.

As such, conventional system 100 requires the use RMII bus 103, which has 8 pins per port (excluding management signals) between BMC 104 and LOM 102. As such, the RMII bus 103 adds complexity to the motherboard design. It also precludes sharing network cards that do not have RMII connection, such as any add-in NIC card.

With the advent of PCIe Vendor-Defined-Messages (VDM) technology, service processors such as BMC 104 can use the Management Component Transport Protocol (MCTP) over PCIe VDM to transport network pass-through packets to any NIC on the PCIe bus, thus eliminating the need for complex wiring and providing shared network connectivity on any NIC adapter. A problem with that approach, however, is that the IHS has to be turned on for PCIe VDM to work. When the IHS is turned off, BMC 104 can still use MCTP over $I^2C$ to transport network packets, but this is a slow connection. Accordingly, to address these, and other problems, the inventors hereof have developed systems and methods for using PCIe-VDM and $I^2C$ transport for network communications.

Figure 2:
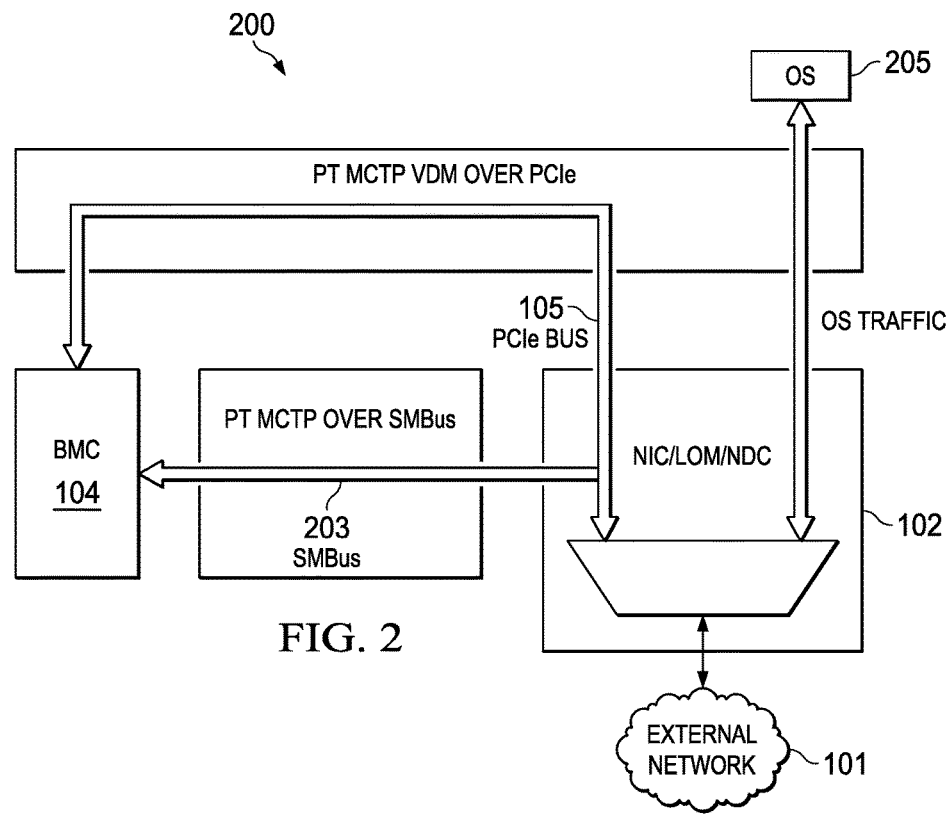
FIG. 2 is a diagram of a system for handling pass-through packets in a powered down IHS according to some embodiments.

FIG. 2 is a diagram of system 200 for handling pass-through packets in a powered down IHS according to some embodiments. In system 200, BMC 104 is coupled to NIC/LOM/NDC 102 via System Management Bus (SMBus) 203 or other suitable type of $I^2C$ bus. BMC 104 is also coupled to NIC/LOM/NDC 102 via PCIe bus 105. External network 101 sends or receives Operating System (OS) 205 traffic, which is routed to and from host processor 106. Pass-through traffic is routed to or from BMC 104 through buses 105 or 203, depending upon the bandwidth requirement of the PT traffic.

Figure 3:
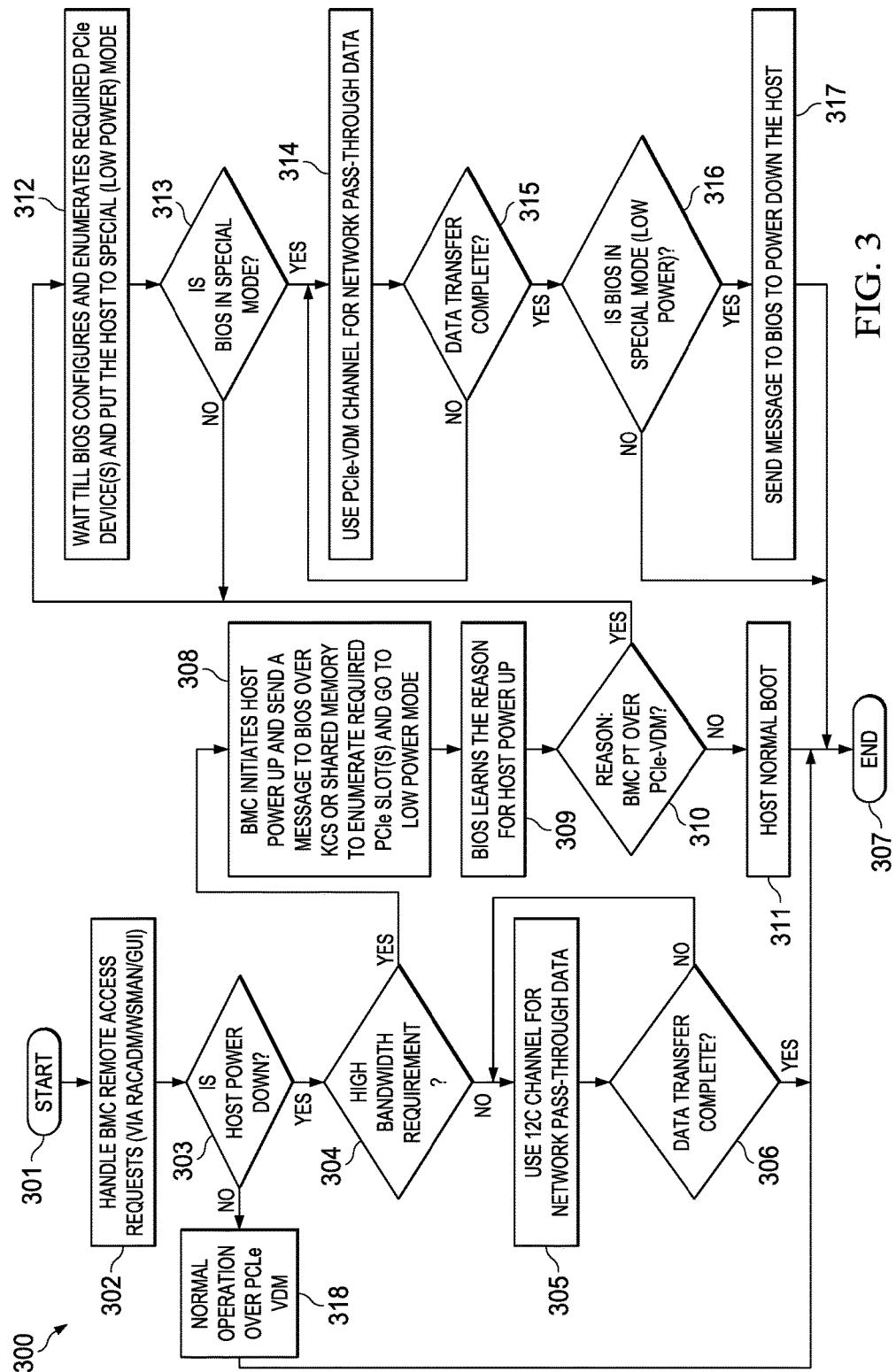
FIG. 3 is a flowchart of a method for handling pass-through packets in a powered down IHS according to some embodiments.

In operation, system 200 performs method 300 of FIG. 3 for handling pass-through packets in a powered down IHS according to some embodiments. Particularly, method 300 begins at block 301. At block 302, method 300 handles BMC remote access requests (e.g., from a remote IHS coupled to external network 101) received, for example, via a DELL Remote Access Controller Admin (RACADM), Web-Services Management (WSMAN), or other Graphical User Interface (GUI).

Block 303 determines whether host processor 106 is powered off or down (e.g., in a sleep state). In some cases, block 303 may determine whether host processor 106 is in one of the Advanced Configuration and Power Interface (ACPI) sleep states S1-S3. Additionally or alternatively, block 303 may determine whether host processor 106 is in the S4 state ("hibernation"). Additionally or alternatively, block 303 may determine whether host processor 106 is in the S5 state ("soft off").

If host processor 106 is powered on, block 318 initiates normal operation over PCIe-VDM, and method 300 ends at block 307. If the host is powered down or off such that PCIe-VDM is not available, block 304 determines whether the request has a high bandwidth requirement. Specifically, block 304 determines whether the pass-through traffic is expected to need a bandwidth greater than what can provided by an I$^2$C bus, such as SM Bus 203. If not, at block 305 method 300 causes system 200 to use the I$^2$C bus to transport PT traffic to and from BMC 104. Block 306 determines is the data transfer is complete; if not, control returns to block 305. Otherwise method 300 ends at block 307.

If the pass-through traffic is determined to require high bandwidth (e.g., a selected threshold value above a few 100 Kbits/s) at block 304, at block 308 BMC 104 requests that host processor 106 be powered up and sends a message to the IHS's Basic Input/Output System (BIOS) (shown in FIG. 5) over a Keyboard Controller Style (KCS) interface or shared memory to enumerate required PCIe slot(s) and to go on low-power mode immediately thereafter. At block 309, the BIOS determines the reason for the host power up request. At block 310, if the BIOS determines that host processor 106 is being powered on to activate a PCIe bus, control passes to block 312. Otherwise method 300 allows host processor 106 to boot normally at block 311 before the method ends at block 307.

At block 312 method 300 waits until the BIOS configures and enumerates required PCIe device(s) and puts host processor 106 is a low-power, pass-through mode of operation. At block 313, method 300 determines whether the BIOS has completed the operations of block 312 (that is, the BIOS is also in the pass-through mode). If not, control returns to block 312.

If host processor 106 is not powered down or off, as determined in block 307, or if block 313 determines that the BIOS is in the pass-through mode of operation (that is, the PCIe enumeration process is completed), method 300 uses PCIe-VDM channels at block 314 for network pass-through data to and from BMC 104. Block 315 determines if the data transfer is complete. If not, control returns to block 314.

Once block 315 determines that the data transfer via the PCIe-VDM channel is complete, block 316 determines if the BIOS is still in the pass-through mode of operation. If not, method 300 ends at block 307. If so, method 300 sends a message to the BIOS to power down host processor 106 and the method ends again at block 307.

In sum, the system and method of FIGS. 2 and 3 are configured to handle PT traffic In case of host processor 106 being powered down, where the PCIe bus is not otherwise accessible from BMC 104. Considering that PT over SMBus 203 is slow, if the data transfer rate required is less than few 100 Kbits/s, then system 200 can use Network Controller Sideband Interface (NCSI) side band communication over SMBus 203, since I$^2$C still works even in the host power down mode scenario.

However, in case more data transfer rate is required and the host processor is powered down, system 200 uses a PCIe VDM channel for PT traffic between BMC 104 and any NIC card 102. By replacing RMII bus 103 with MCTP over PCIe-VDM bus 105, system 200 gets more bandwidth without any extra hardware cost.

Method 300 provides a manner with which network PT packets may be sent over SMBus/PCIe-VDM based on data transfer rate requirements, even when host processor 106 is powered down. Currently, in case if more data bandwidth is required when the IHS is already powered ON, the PCIe-VDM channel is more immediately accessible. Method 300, on the other hand, provides a technique for using the PCIe-VDM channel when the IHS is shut down.

Generally, BMC 104 gets a remote access request (e.g., via RACADM CLI (Command Line Interface), WSMAN API, Web GUI get, etc.). If a high data transfer rate is required between BMC 104 and external network 101, then method 300 checks to see if host processor 106 is powered off. If so, the host processor is powered on and BMC 104 sends a message to BIOS 401 over Shared Memory or KCS to inform the BIOS that the reason for power-up is BMC PT over PCIe-VDM. BIOS 401 boots up and learns the reason for power-up to enable and enumerate required PCIe slot/s for PCIe VDM communication.

In that regard, BIOS 401 may skip any memory test, video initialization and other unnecessary boot steps, and goes directly to PCI enumeration in order to quickly enable the PCIe VDM subsystem and not delay the remote communication. After PCI bus enumeration, BIOS 401 halts the boot process and waits for BMC 104 to be done with its high speed transfer. Optionally, BIOS 401 can put CPU 106 in a low power state to reduce power consumption. Once the data transfer is completed, method 300 checks if the BIOS is still in a special (Low power) mode. If the BIOS is in the special mode, method 300 shuts down the IHS. Moreover, while BIOS 401 is starting up and enumerating the desired card, in order to keep the network connection up, BMC 104 may keep responding on the I$^2$C channel until the PCIe VDM channel is up.

Figure 4:
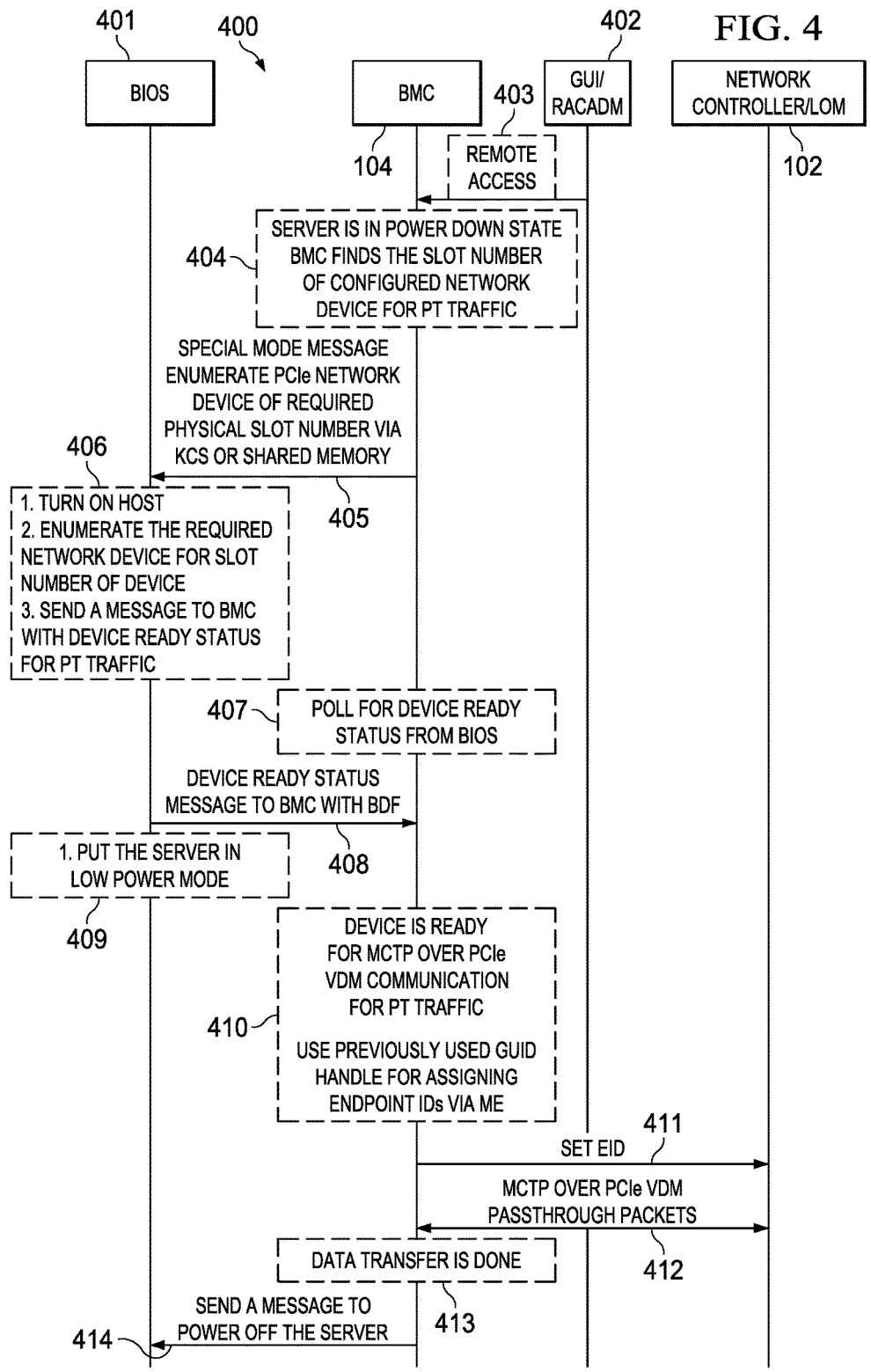
FIG. 4 is a sequence diagram of a method for handling pass-through packets in a powered down IHS according to some embodiments.

To further illustrate the foregoing, FIG. 4 is a sequence diagram 400 of method 300 according to some embodiments. At step 403, a remote user operating a GUI/RACADM 402 sends a remote access request to BMC 104 through external network 101. At step 404, the IHS or server may be in a power down state, and BMC 104 finds the slot number of the configured network device for pass-through traffic. Then, BMC 104 sends message 405 to BIOS 401 to enter a pass-through mode of operation where it enumerates PCIe network device ports of the required physical slot number via KCS or shared memory. In some cases, BIOS 401 may skip a memory test operation, a video initialization operation, or any other conventional boot-up procedure.

When in a pass-through mode of operation at step 406, BIOS 401 turns on or wakes up host processor 106, enumerates the required network device for slot number identified by BMC 104, and sends a message 408 to BMC 106 with a device ready status for pass-through traffic. Additionally or alternatively, at step 407, BMC 106 may poll BIOS 407 for a device ready status. Then, at step 409, BIOS 401 puts host processor 106 in a low power mode.

At step 410 the network device is ready for MCTP over PCIe VDM communication for pass through traffic, and previously a used Globally Unique Identifier (GUID) handle may be used for assigning endpoint IDs via a management engine (ME), therefore BMC 104 sets the EID of LOM 102 with message 411. Messages 412 represent network traffic using MCTP over PCIe-VDM pass through packets between BMC 104 and LOM 102. At step 413 the data transfer is complete and BMC 104 sends message 414 to BIOS 401 to power off the IHS.

In order to avoid losing data while switching between I$^2$C and PCIe-VDM, the handover is performed quickly. In some embodiments, BIOS 401 does a quick boot where it only enumerates the requested LOM 102. BIOS sends the Bus Device Function (BDF) to BMC 104 and halts. BMC 104 in turn bypasses the MCTP discovery process and uses the previously obtained GUID handle from ME to assign an endpoint ID. Then BMC 104 starts communicating via PCIe-VDM.

In sum, the systems and methods described above allow fast PCIe VDM communication when server is down by going into a partially power up mode. These systems and methods enable quick targeted PCI enumeration of requested device only, bypass MCTP discovery to speed up handover between I²C and PCIe transports, eliminate the need for a RMII connection, and use a common interface to access external network 101 using LOMs/NICs/NDCs 102. Based on the remote access to BMC 104 (e.g., via IPMI, RACADM, remote RACADM, WSMAN, GUI, SSH, etc.), BMC 104 can seamlessly switch between I²C and VDM for different bandwidth requirements when the host processor is powered down.

As such, the techniques discussed herein promote seamless communication of pass-through traffic on all the PCIe based Network cards. Moreover, these techniques are applicable to modular platforms as well, as PCIe-VDM communication can happen seamlessly with network controllers outside the IHS.

Figure 5:
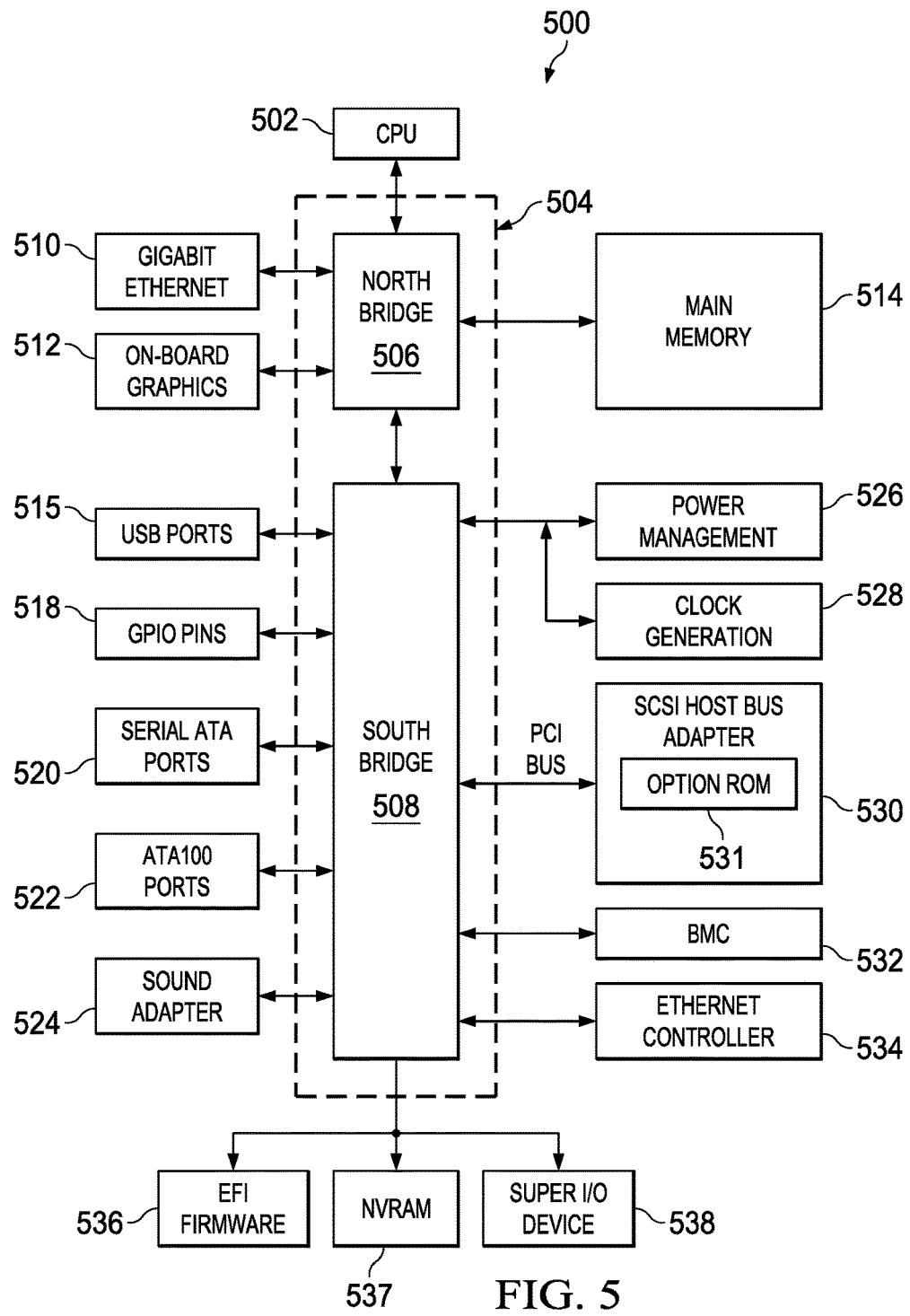
FIG. 5 is a diagram of an example of an IHS according to some embodiments.

FIG. 5 shows an example of IHS 500 configured to implement systems and methods described above. It should be appreciated that although certain embodiments described herein may be discussed in the context of a desktop or server computer, other embodiments may be utilized with virtually any type of IHS. Particularly, IHS 500 includes a baseboard or motherboard, which is a printed circuit board (PCB) to which components or devices are coupled by way of a bus or other electrical communication path. For example, central processing unit ("CPU") 502 operates in conjunction with a chipset 504; CPU 502 is a standard central processor that performs arithmetic and logical operations necessary for the operation of IHS 500.

Chipset 504 includes northbridge 506 and southbridge 508. Northbridge 506 provides an interface between CPU 502 and the remainder of IHS 500. Northbridge 506 also provides an interface to a random access memory (RAM) used as main memory 514 in IHS 500 and, possibly, to on-board graphics adapter 512. Northbridge 506 may also be configured to provide networking operations through Ethernet adapter 510. Ethernet adapter 510 is capable of connecting IHS 500 to another IHS (e.g., a remotely located IHS) via a network. Connections which may be made by network adapter 510 may include local area network (LAN) or wide area network (WAN) connections. Northbridge 506 is also coupled to southbridge 508.

Southbridge 508 is responsible for controlling many of the input/output (I/O) operations of IHS 500. In particular, southbridge 508 may provide one or more universal serial bus (USB) ports 516, sound adapter 524, Ethernet controller 534, and one or more general purpose input/output (GPIO) pins 518. Southbridge 508 may also provide a bus for interfacing peripheral card devices such as BIOS boot system-compliant SCSI host bus adapter 530. In some embodiments, the bus may include a peripheral component interconnect (PCI) bus. Southbridge 508 may also provide baseboard management controller (BMC) 532 for use in managing the various components of IHS 500. Power management circuitry 526 and clock generation circuitry 528 may also be utilized during the operation of southbridge 508.

Southbridge 508 is further configured to provide one or more interfaces for connecting mass storage devices to IHS 500. For instance, in an embodiment, southbridge 508 may include a serial advanced technology attachment (SATA) adapter for providing one or more serial ATA ports 520 and/or an ATA100 adapter for providing one or more ATA 100 ports 522. Serial ATA ports 520 and ATA100 ports 522 may be, in turn, connected to one or more mass storage devices storing an operating system (OS) and application programs. An OS comprises a set of programs that control operations of IHS 500 and allocation of resources. An application program is software that runs on top of the OS and uses computer resources made available through the OS to perform application specific tasks desired by the user.

Mass storage devices connected to southbridge 508 and SCSI host bus adapter 530, and their associated computer-readable media provide non-volatile storage for IHS 500. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 500. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 508 for connecting Super I/O device 538. Super I/O device 538 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 536 that includes program code containing the basic routines that help to start up IHS 500 and to transfer information between elements within IHS 500. EFI firmware 536 comprises a firmware that is compatible with the EFI Specification and the Framework.

The LPC interface may also be utilized to connect NVRAM 537 to IHS 500. NVRAM 537 may be utilized by firmware 536 to store configuration data for IHS 500. In other embodiments, configuration data for IHS 500 may be stored on the same NVRAM 537 as the firmware 536.

BMC 532 may include non-volatile memory having program instructions stored thereon that are usable by CPU(s) 502 to enable remote management of IHS 500. For example, BMC 532 may enable a user to discover, configure, and manage BMC 532, setup configuration options, resolve and administer hardware or software problems, etc. Additionally or alternatively, BMC 532 may include one or more firmware volumes, each volume having one or more firmware files used by the BIOS' firmware interface to initialize and test components of IHS 500.

As a non-limiting example of BMC 532, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 500 from the factory.

It should be appreciated that, in other embodiments, IHS 500 may comprise other types of computing devices, including hand-held computers, embedded computer systems, personal digital assistants, and other types of computing devices. It is also contemplated that the IHS 500 may not include all of the components shown in FIG. 5, may include other components that are not explicitly shown in FIG. 5, or may utilize an architecture different than that shown in FIG. 5.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:
1. An Information Handling System (IHS), comprising:
a host processor;
a Basic Input/Output System (BIOS) coupled to the host processor;
a Baseboard Management Controller (BMC) coupled to the host processor; and
a memory coupled to the BMC, the memory having program instructions stored thereon that, upon execution, cause the BMC to:
receive a message over a network while the host processor is powered off, wherein the message originates from a remote IHS and targets the BMC; and
in response to a pass-through data transfer rate available to the BMC not meeting a threshold value:
power on the host processor;
request that the BIOS boot up; and
perform a communication with the remote IHS via a Peripheral Component Interconnect Express (PCIe) bus using a PCIe Vendor-Defined Message (PCIe-VDM) supported by the host processor, wherein the BIOS is configured to: halt the booting of the host processor upon enumeration of one or more PCIe slots at least until the communication with the remote IHS is performed.

2. The IHS of claim 1, wherein the program instructions further cause the BMC to evaluate the pass-through data transfer rate available to the BMC through an Inter-Integrated Circuit ($I^2C$) bus.

3. The IHS of claim 1, wherein the BIOS is configured to evaluate whether the booting up is being requested in order for the BMC to perform the communication.

4. The IHS of claim 3, wherein the BIOS is configured to boot up in a special mode of operation that skips a memory test.

5. The IHS of claim 3, wherein the BIOS is configured to boot up in a special mode of operation that skips a video initialization procedure.

6. The IHS of claim 3, wherein the BIOS is configured to boot up in a special mode of operation that only enumerates the one or more Peripheral Component Interconnect Express (PCIe) slots.

7. The IHS of claim 3, wherein the BIOS is configured to place the host processor in a low-power state while the communication with the remote IHS is performed.

8. The IHS of claim 1, wherein the program instructions, upon execution, further cause the BMC to:
determine that the communication with the remote IHS is complete; and
power off the host processor.

9. A method, comprising:
receiving, at a Baseband Management Controller (BMC) of an Information Handling System (IHS) while a host processor of the IHS is powered off, a network packet that originates from a remote IHS and targets the BMC; and
determining that a pass-through data transfer rate available to the BMC through an Inter-Integrated Circuit ($I^2C$) bus is insufficient for performing a communication between the BMC and the remote IHS;
requesting that a Basic Input/Output System (BIOS) boot up the host processor in a Peripheral Component Interconnect Express (PCIe) pass-through mode of operation;
establishing the communication between the BMC and the remote IHS via a PCIe bus using a PCIe Vendor-Defined Message (PCIe-VDM) supported by the host processor; and
powering off the host processor after the communication is completed, wherein the BIOS is configured to halt the booting of the host processor upon enumeration of one or more PCIe slots at least until the communication between the BMC and the remote IHS is completed.

10. The method of claim 9, wherein the BIOS is configured to skip a memory test procedure upon a determination that the request is being made to enable PCIe pass-through communications.

11. The method of claim 10, wherein the BIOS is configured to skip a video initialization procedure upon the determination that the request is being made to enable the PCIe pass-through communications.

12. The method of claim 11, wherein the BIOS is configured to enumerate the one or more PCIe slots upon the determination that the request is being made to enable the PCIe pass-through communications.

13. The method of claim 12, wherein the BIOS is configured to place the host processor in a low-power state while the communication between the BMC and the remote IHS is performed.

14. A non-transitory memory device having program instructions stored thereon that, upon execution by an Information Handling System (IHS), cause the IHS to:
receive, at a Baseband Management Controller (BMC) while a host processor is powered off, a packet that originates from a remote IHS and targets the BMC; and
determine that a pass-through data transfer rate available to the BMC through an Inter-Integrated Circuit (I²C) bus is insufficient for performing a communication between the BMC and the remote IHS;
request that a Basic Input/Output System (BIOS) boot up the host processor in a Peripheral Component Interconnect Express (PCIe) pass-through mode of operation;
establish the communication between the BMC and the remote IHS via a PCIe bus using a PCIe Vendor-Defined Message (PCIe-VDM) supported by the host processor; and
power off the host processor after the communication is completed, wherein the BIOS is configured to halt the booting of the host processor upon enumeration of one or more PCIe slots at least until the communication between the BMC and the remote IHS is completed.

15. The memory device of claim 14, wherein the BIOS is configured to skip a memory test procedure and a video initialization procedure upon a determination that the request is being made to enable PCIe pass-through communications.

16. The memory device of claim 14, wherein the BIOS is configured to enumerate the one or more PCIe slots upon the determination that the request is being made to enable PCIe pass-through communications.

17. The memory device of claim 14, wherein the BIOS is configured to place the host processor in a low-power state while the communication between the BMC and the remote IHS is performed.

* * * * *